April 28, 1942.  G. A. LYON  2,281,529
ORNAMENTAL TRIM RING
Filed Jan. 21, 1939  2 Sheets-Sheet 1
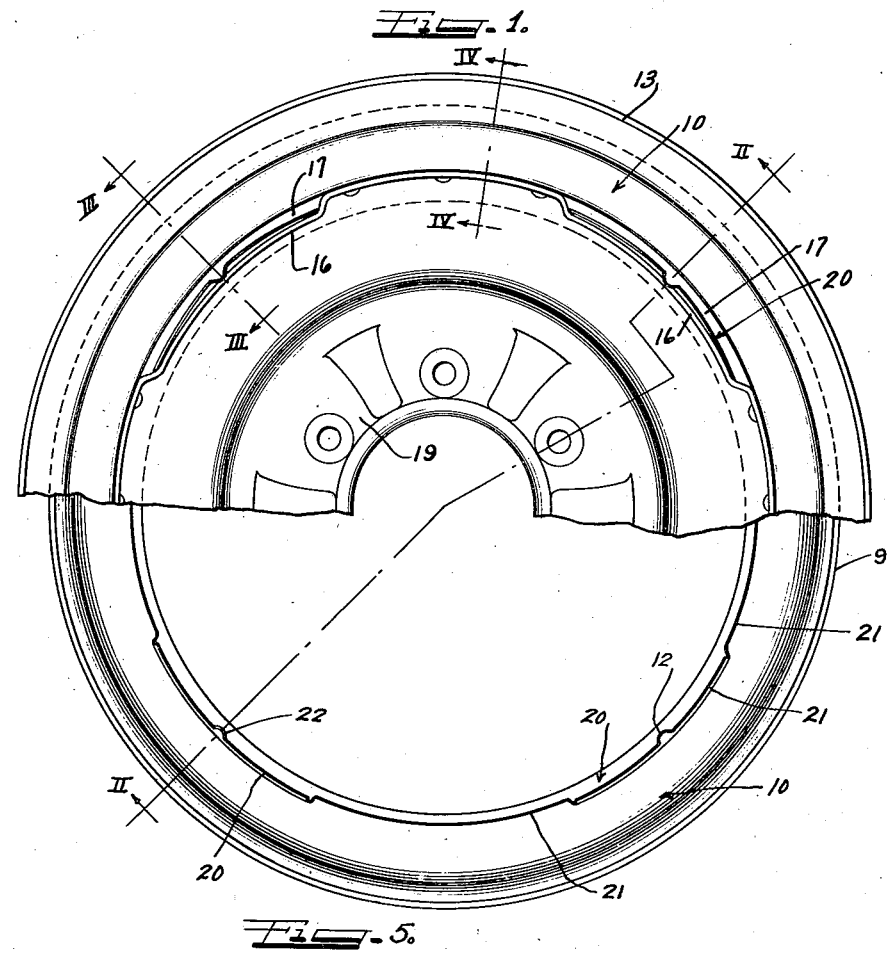
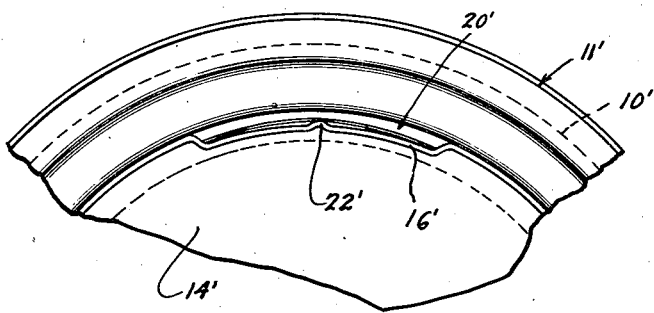
Inventor
GEORGE ALBERT LYON.
by
Charles Allen
Attys.

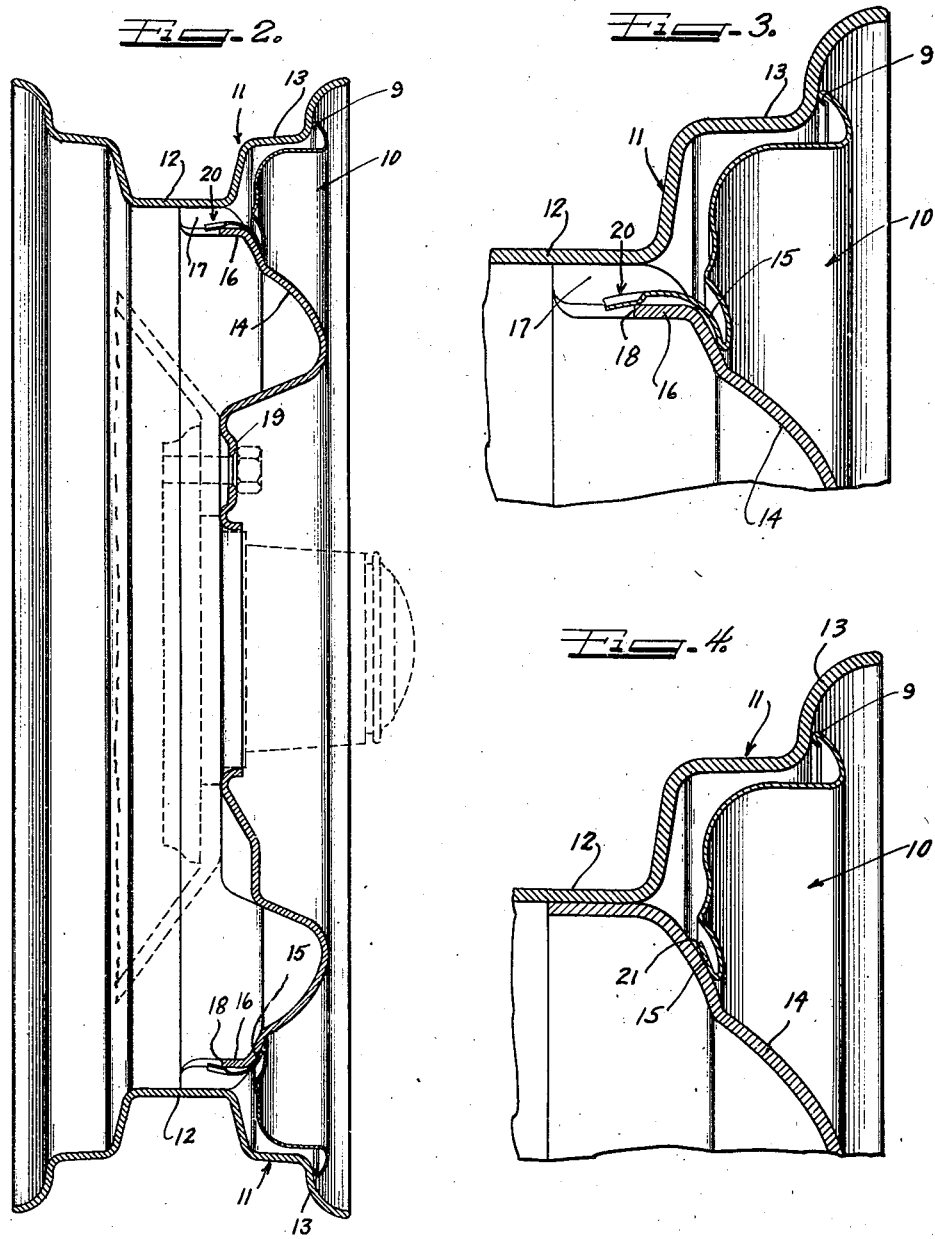

Patented Apr. 28, 1942

2,281,529

UNITED STATES PATENT OFFICE 2,281,529

ORNAMENTAL TRIM RING

George Albert Lyon, Allenhurst, N. J.

Application January 21, 1939, Serial No. 252,097

6 Claims. (Cl. 41—10)

This invention relates to ornamental trim rings for wheels and more particularly to an ornamental trim ring having rearwardly projecting resilient means for retaining cooperation with one of the wheel members and openings provided adjacent the base of the tire rim member.

An object of this invention is to provide an ornamental trim ring for wheels with improved means for retaining it on the wheel.

Another object of this invention is to provide a wheel construction including a wheel having rim and body members and a trim ring cooperable therewith with means for retaining the trim ring on the wheel, which means constitute integral portions of the trim ring.

Still another object of this invention is to provide a wheel construction of the aforesaid type with a trim ring which has integrally extending therefrom resilient projections adapted to be snapped into a firm and tight retaining engagement with the wheel body member.

In accordance with the general features of this invention, there is provided a wheel construction inclding a wheel having a tire rim member and a body member provided with a plurality of circumferentially spaced axially extending openings in its outer peripheral portion adjacent the rim member and an ornamental trim member provided with a plurality of rearwardly extending projections at circumferentially spaced points on an inner margin of the rim member and of such construction and arrangement as to register with the openings in the wheel body member, each of the projections being arcuate in the direction of the circumference of a portion of the trim member and having an intermediate portion for a snap-on retaining engagement with one of the wheel members upon the ornamental member being pressed axially into position on the wheel.

In accordance with other features of the invention, the retaining projections on the trim ring are provided by cutting out sections of an inner edge of the ring, so that the projections in reality constitute arcuate segments disposed in a common circle.

Another and further feature of the invention relates to the bowing of an intermediate portion of each of the arcuate segmental retaining projections so that such bowed portion may have retaining engagement with the wheel thereby supporting the trim ring at a plurality of circumferentially spaced points on the wheel.

Other objects and features of this invention will more fully appear from the following detailed description taken in connection with the accompanying drawings which illustrate several embodiments thereof, and in which:

Figure 1 is a rear side view of a wheel construction embodying this invention and partly broken away to show the construction of the openings in the wheel body, as well as the manner in which the springs on the ornamental member cooperate therewith;

Figure 2 is an enlarged cross sectional view taken on the line II—II of Figure 1 looking in the direction indicated by the arrows and showing the wheel applied to a central support;

Figure 3 is an enlarged fragmentary sectional view corresponding to a portion of the upper part of Figure 2 and taken on the line III—III of Figure 1;

Figure 4 is an enlarged fragmentary cross sectional view corresponding to the lower portion of Figure 2 and taken on the line IV—IV of Figure 1; and Figure 5 is a fragmentary of a side of a wheel construction showing a modification in the coaction between the spring element and the wheel body member.

As shown in the drawings:

The reference character 10 designates generally an ornamental trim member or ring embodying the features of this invention. This ring may be made of any suitable metallic material, but is preferably made from strip steel, such, for example, as stainless steel, and has its ends welded together. It may also be made, if it is so desired, by blanking it from suitable sheet stock.

This ring is adapted to be disposed over an outer side of a wheel including a wheel rim member 11 and a wheel body or hub member 14. The rim member 11 is known in the trade as the conventional type of drop center tire rim. It includes the usual side flanges 13 and base flange 12.

The body or hub part 14 is of the usual bulged type and has a central mounting flange 19 which is adapted to be bolted in the usual manner to a suitable central support. The outer peripheral margin of this body member 14 is secured as by means of riveting or welding to the base flange 12 of the rim member 11.

The outer peripheral margin of the wheel body member 14 has a plurality of depressed or kicked-in sections 16 which are illustrated as being four in number, although it is, of course, to be understood that this number may be varied to suit the requirements of a given wheel. These kicked-in sections 16 extend in a direction paralleling the axis of the wheel, and each of them provide an opening 17 directly inside of the base flange 12 of the rim member or, in other words, at the junction of the two wheel members. These openings 17 likewise extend in a direction paralleling the axis of the wheel and may serve as ventilation openings for providing a circulation of air to the usual brake drum (not shown) associated with the wheel.

The trim member or ring 10 has its outer edge turned as indicated at 9 and is adapted to bear against one of the flanges 13 of the rim member 11. The inner margin of this ring 10 is turned back upon itself as indicated at 15, and this turned back portion has a plurality of sections cut out of it, as indicated at 21 in Figure 1, leaving a plurality of rearwardly extending projections 20. In Figure 4, I have illustrated the cross section of the ring through one of the cut out sections, whereas in Figure 3, I have illustrated the cross section of the ring taken through one of the rearwardly extending projections 20.

From Figure 4, it is evident that the rear marginal portion 15 of the ring is provided with four cut-outs 21 and four rearwardly extending projections 20. Each of the projections 20 is so disposed as to extend through the corresponding opening 17 in the wheel body member 14. The cut-out 21 is such that the edge of the cut out section will be disposed in close proximity to the adjoining surface of the wheel body member.

Each of the projections also has a bowed or depressed intermediate portion 22 which is adapted to be snapped over and to overhang the rear edge portion or shoulder 18 of the associated depressed section 16 in the wheel body member 14. This construction is such that only the bowed portion or hump 22 on each projection 21 is snapped into retaining contact with the edge 18. As a consequence, the remaining or side portions of the arcuate projections 20 are free to flex or, in other words, to be distorted upon the pressing of the ornamental member into retained engagement with the wheel.

In Figure 5, I have illustrated a slight modification of the invention wherein the hump or raised portion 22', corresponding to the portion 22 of the preferred form, is provided on the depressed section 16' of the wheel body member 14' instead of on the projection 20'. With this single exception, the trim ring 10' of this modification cooperates with the rim and body members 11' and 14' in substantially the same manner as the previously described form. It will be appreciated that in this modification, when the disk is snapped "home" into a retained position, the plurality of humps or raised sections 22' on the inwardly depressed section 16' on the wheel body member 14' will act to distort or stress the spring projections so as to cause the spring projections to be frictionally bound in a retaining engagement with the depressed section 16'.

I claim as my invention:

1. As an article of manufacture, an ornamental trim ring for a wheel including a rim member having a plurality of radial flanges as well as a base flange and a body member having spaced apertures at its junction with the rim member, said ring having a radially inner turned edge provided with a plurality of spaced resilient projections adapted to extend through said apertures and to each embrace an inner and concealed shoulder of one of said members for retaining the ring on the wheel, said projections being separated by cut out sections in said turned edge and being adapted to be snapped into retaining engagement upon application of the ring in an axial direction to the wheel, the other and radially outer edge of said ring being turned to bear against a radial flange of the rim member.

2. As an article of manufacture, an ornamental trim ring for a wheel including a rim member having a plurality of radial flanges as well as a base flange and a body member having spaced apertures at its junction with the rim member, said ring having a radially inner turned edge provided with a plurality of spaced resilient projections adapted to extend through said apertures and to each embrace an inner and concealed shoulder of one of said members for retaining the ring on the wheel, said projections being separated by cut out sections in said turned edge and being adapted to be snapped into retaining engagement upon application of the ring in an axial direction to the wheel, each of said projections having a depressed intermediate portion for bearing against said shoulder.

3. As an article of manufacture, an ornamental trim ring for a wheel including a rim member having a plurality of radial flanges as well as a base flange and a body member having spaced apertures at its junction with the rim member, said ring having a radially inner portion provided with a plurality of spaced resilient projections adapted to extend through said apertures and to each embrace an inner and concealed shoulder of one of said members for retaining the ring on the wheel, said fingers being adapted to be snapped into retaining engagement upon application of the ring in an axial direction to the wheel, said fingers each comprising an integral extension on said inner portion of arcuate configuration in both longitudinal and transverse directions.

4. As an article of manufacture, an ornamental trim member for a wheel including a rim member having a plurality of radial flanges as well as a base flange and a body member having spaced openings at its junction with the rim member, said trim member comprising a metallic circular member provided with a plurality of rearwardly extending flexible integral projections of such width as to be adapted to extend substantially through said openings in the wheel body member for engagement with a concealed and rear portion of the body member to retain the ornamental member on the wheel, each of said projections comprising an arcuate segment of the radially inner marginal portion of said trim member.

5. As an article of manufacture, an ornamental trim member for application to the outer side of a wheel having rim and body members, the rim member including a base flange and the body member having a plurality of circumferentially spaced axially extending openings in its outer peripheral portion adjacent the base flange, said trim member comprising a circular metallic member provided with a plurality of rearwardly extending projections which extend at circumferentially spaced points from a radially inner edge of the trim member and of such width as to extend substantially through the openings in the wheel body member, each of said projections being arcuate in the direction of said inner margin and having an intermediate bowed portion for retaining engagement with one of said wheel members upon the ornamental member being pressed axially into position on the wheel.

6. As an article of manufacture, an ornamental trim member for application to the outer side of a wheel having rim and body members, the rim member including a base flange and the body member having a plurality of circumferentially spaced axially extending openings in its outer peripheral portion adjacent the base flange, said trim member comprising a circular metallic member provided with a plurality of rearwardly extending projections which extend at circumferentially spaced points from a radially inner edge of the trim member and of such width as to extend substantially through the openings in the wheel body member, each of said projections comprising a cut out segment of the inner margin of said trim member and extending rearwardly behind the trim member and terminating in an offset end portion for overhanging a portion of one of the wheel members when the trim member is snapped into retaining cooperation with the wheel.

GEORGE ALBERT LYON.